(12) United States Patent
Saitoh et al.

(10) Patent No.: US 10,317,301 B2
(45) Date of Patent: Jun. 11, 2019

(54) PRESSURE SENSOR AND SHOCK MITIGATING MEMBER

(71) Applicant: SMC CORPORATION, Chiyoda-ku (JP)

(72) Inventors: Mitsuhiro Saitoh, Koshigaya (JP); Shogo Kurisaki, Yashio (JP); Hiroto Nakajima, Tsukubamirai (JP)

(73) Assignee: SMC CORPORATION, Chiyoda-ku (JP)

( * ) Notice: Subject to any disclaimer, the term of this patent is extended or adjusted under 35 U.S.C. 154(b) by 117 days.

(21) Appl. No.: 15/662,560

(22) Filed: Jul. 28, 2017

(65) Prior Publication Data
US 2018/0038757 A1    Feb. 8, 2018

(30) Foreign Application Priority Data

Aug. 4, 2016  (JP) ................. 2016-153417

(51) Int. Cl.
*G01L 19/06*   (2006.01)
*G01L 7/08*    (2006.01)
(Continued)

(52) U.S. Cl.
CPC ............ *G01L 19/0609* (2013.01); *F16F 9/34* (2013.01); *G01L 7/082* (2013.01); *B65G 47/91* (2013.01)

(58) Field of Classification Search
CPC ... G01L 19/147; G01L 9/0042; G01L 9/0072; G01L 13/025; G01L 19/04; G01L 9/0054; G01L 9/0075; G01L 19/0038; G01L 19/0084; G01L 19/14; G01L 19/0069; G01L 19/0618; G01L 19/0645; G01L 9/0055; G01L 9/0073; G01L 19/0092; G01L 19/143; G01L 9/0051; G01L 9/0052; G01L 11/025; G01L 19/0007;
(Continued)

(56) References Cited

U.S. PATENT DOCUMENTS

| 5,464,172 A | * | 11/1995 | Jensen | .................. B29C 70/207 |
| | | | | 102/293 |
| 2017/0197531 A1 | * | 7/2017 | Beasley | ................. B60N 2/502 |

FOREIGN PATENT DOCUMENTS

| JP | 50-118687 U | 9/1975 |
| JP | 52-140379 A | 11/1977 |

(Continued)

OTHER PUBLICATIONS

Japanese Office Action dated Feb. 12, 2019 in Japan Patent Application No. 2016-153417 with English Machine Translation.

*Primary Examiner* — Andre J Allen
(74) *Attorney, Agent, or Firm* — Oblon, McClelland, Maier & Neustadt, L.L.P.

(57) ABSTRACT

A pressure sensor includes a joint portion, and a shock mitigating member including therein a flow path communicating with a branch path. The shock mitigating member includes a first flow path configured to cause a fluid to linearly flow, a blocking wall configured to block the fluid from linearly flowing, and a second flow path communicating with the first flow path and configured to cause the fluid to flow in a direction different from an axial center of the first flow path. Further, the shock mitigating member includes outlets with which the second flow path communicates, and a gap for adjusting a pressure of the fluid is formed between the shock mitigating member and the joint portion.

7 Claims, 5 Drawing Sheets

(51) Int. Cl.
*F16F 9/34* (2006.01)
*B65G 47/91* (2006.01)

(58) Field of Classification Search
CPC . G01L 19/0046; G01L 19/06; G01L 19/0627;
G01L 19/0681; G01L 9/00; G01L 9/0041;
G01L 9/0044; G01L 11/04; G01L
19/0023; G01L 19/0672; G01L 19/069;
G01L 19/142; G01L 19/16; G01L 27/002;
G01L 7/00; G01L 7/163; G01L 7/166;
G01L 9/0047; G01L 11/02; G01L 13/00;
G01L 15/00; G01L 19/0609; G01L
19/083; G01L 19/10; G01L 19/148; G01L
7/08; G01L 9/0045; G01L 9/0048; G01L
9/006; G01L 9/007; G01L 9/0076; G01L
9/045; G01L 9/06; G01L 9/065; G01L
9/12; G01L 9/125; G01L 11/00; G01L
17/00; G01L 19/00; G01L 19/0015; G01L
19/003; G01L 19/0076; G01L 19/02;
G01L 19/08; G01L 19/141; G01L 19/145;
G01L 19/146; G01L 1/142; G01L 1/2262;
G01L 1/246; G01L 21/12; G01L 23/16;
G01L 27/005; G01L 27/007; G01L 7/04;
G01L 7/063; G01L 7/082; G01L 7/084;
G01L 7/086; G01L 7/16; G01L 9/0002;
G01L 9/0007; G01L 9/0016; G01L
9/0019; G01L 9/0022; G01L 9/0027;
G01L 9/0033; G01L 9/0039; G01L 9/005;
G01L 9/0058; G01L 9/0077; G01L
9/0079; G01L 9/008; G01L 9/0092; G01L
9/0095; G01L 9/025; G01L 9/04; G01L
9/08; G01L 9/085; G01L 9/105; G01L
9/14; G01L 9/16
USPC .................................................. 73/700–756
See application file for complete search history.

(56) References Cited

FOREIGN PATENT DOCUMENTS

| JP | 53-094985 A | 8/1978 |
| JP | 08-271367 A | 10/1996 |
| JP | 2013-064664 | 4/2013 |

* cited by examiner

PRESSURE SENSOR AND SHOCK MITIGATING MEMBER

CROSS-REFERENCE TO RELATED APPLICATION

This application is based upon and claims the benefit of priority from Japanese Patent Application No. 2016-153417 filed on Aug. 4, 2016, the contents of which are incorporated herein by reference.

BACKGROUND OF THE INVENTION

Field of the Invention

The present invention relates to a pressure sensor that detects a pressure of a fluid based on deformation of a diaphragm, and a shock mitigating member that forms a portion of the pressure sensor in which the fluid flows.

Description of the Related Art

Conveying devices that suction and lift workpieces include, for example, pressure sensors that each detect an air pressure in order to determine a suctioned state of the workpiece. This type of pressure sensors each include a diaphragm as part of an inner wall that forms an inner space, and detects a pressure based on deformation of the diaphragm caused by a pressure of a fluid flowing in the inner space (see, for example, Japanese Laid-Open Patent Publication No. 2013-064664).

In the pressure sensors of this type, generally, a flow route from an inlet port through which a fluid flows thereinto to the diaphragm is linearly formed, and the diaphragm is disposed at a position facing this flow route. Hence, the diaphragm receives a linearly flowing fluid straight (directly), and therefore it is inconvenient that durability of the diaphragm is readily deteriorated.

In view of this inconvenience, for example, a pressure sensor disclosed in Japanese Laid-Open Patent Publication No. 2013-064664 includes an orifice member located upstream of a diaphragm (metal diaphragm) on a flow route of a fluid to regulate an inflow of the fluid and thereby provide a pressure attenuation effect.

SUMMARY OF THE INVENTION

However, the orifice member of the pressure sensor disclosed in Japanese Laid-Open Patent Publication No. 2013-064664 includes a through-hole that allows the fluid to pass through a center portion or near the center portion of the flow route of the fluid. Hence, when the fluid flowing in this pressure sensor passes through the through-hole of the orifice member, even if the pressure lowers, the fluid moves straightforward to the diaphragm and hits a center portion of the diaphragm. Particularly when the fluid includes, in addition to air, moisture and oil, shock due to the collision of the moisture and the oil applies to and readily damage the diaphragm. Therefore, durability of the diaphragm may be deteriorated earlier.

The present invention has been made in light of the above situation. An object of the present invention is to provide a pressure sensor and a shock mitigating member that employ a simple configuration to prevent a fluid from flowing straight and thereby can prevent damage to a diaphragm and improve durability of the diaphragm.

To achieve the above object, the present invention is a pressure sensor that includes a main body portion provided on a passage of a fluid, and a shock mitigating member attached to the main body portion. The shock mitigating member includes a first flow path communicating with the passage and configured to cause the fluid to linearly flow, a wall portion provided so as to face the first flow path and configured to block the fluid from linearly flowing, and a second flow path configured to allow the first flow path and an opening formed in an outer circumferential surface of the shock mitigating member to communicate with each other, and configured to cause the fluid to flow in a direction different from an axial center of the first flow path. A gap is formed between the shock mitigating member and an inner circumferential surface of the main body portion, wherein the gap is configured to adjust the pressure of the fluid flowing out from the opening, and the inner circumferential surface surrounds the shock mitigating member in the vicinity of the opening. The main body portion includes a detection space communicating with the gap, and a diaphragm configured to detect the pressure of the fluid flowing in the detection space.

According to the above, the pressure sensor employs a simple configuration where the shock mitigating member can be attached to the main body portion, whereby it is possible to improve durability of the diaphragm. That is, the fluid flows into the first flow path from a passage, linearly flows through the first flow path, and the flow of the fluid is blocked by the wall portion at the downstream side. Then, the fluid passes through the second flow path in the direction different from the first flow path, and flows out from the opening. Further the fluid flows to the detection space through the gap, so that the diaphragm detects the pressure. Particular, even when the fluid includes moisture or oil, the moisture or the oil is prevented from passing through the first flow path and directly hitting the diaphragm. Consequently, it is possible to significantly suppress damage to the diaphragm. Further, the shock mitigating member or the inner circumferential surface of the main body portion makes it possible to easily adjust an effective cross sectional area of the gap and flow the fluid appropriately.

In this case, the shock mitigating member is preferably formed into a screw shape attachably and detachably screwed to a hole portion formed by the inner circumferential surface.

Thus, the shock mitigating member is formed into the screw shape. Consequently, it is possible to easily attach the shock mitigating member to the inner circumferential surface of the pressure sensor. Further, in the pressure sensor, the effective cross sectional area of the gap can be easily adjusted by exchanging the shock mitigating member when necessary.

In addition to the above configuration, preferably, the shock mitigating member includes a head portion which is exposed through the hole portion in a state where the shock mitigating member is fixed to the inner circumferential surface, and the head portion includes a groove portion configured to allow a tool for screwing the shock mitigating member to be inserted and operated, the groove portion communicating with the first flow path.

Thus, the head portion of the shock mitigating member includes the groove portion. Consequently, it is easier to attach and detach the shock mitigating member to and from the inner circumferential surface, and, when the first or second flow path is subjected to clogging, it is possible to quickly perform maintenance and repair. The groove portion allows the fluid in the passage to smoothly flow into the first flow path.

Further, the shock mitigating member may include a male screw portion screwed to the inner circumferential surface, and the opening may be disposed more deeply side in an insertion direction of the shock mitigating member than the male screw portion. Further, an outer circumferential surface of the shock mitigating member in the vicinity of the opening may be formed into a flat shape when seen in side cross sectional view of the shock mitigating member.

Thus, in the shock mitigating member, the opening is disposed more deeply in the insertion direction than the male screw portion, and the outer circumferential surface in the vicinity of the opening is formed into the flat shape. Consequently, when the fluid flows out through the opening, it is possible to cause the fluid to stably flow along the gap.

Preferably, an axial center of the second flow path is perpendicular to the axial center of the first flow path.

Thus, the axial center of the second flow path is perpendicular to the axial center of the first flow path. Consequently, it is possible to cause the fluid that has flowed through the first flow path and been blocked by the wall portion, to flow toward an outside in a radial direction of the first flow path suitably.

Still further, the wall portion may be arranged at a position apart from a communication position between the first flow path and the second flow path, and form a pocket configured to receive the fluid, at a downstream side in a flowing direction of the first flow path.

Thus, the pressure sensor includes the pocket. Consequently, it is possible to first receive moisture or oil in the pocket and then move the moisture or the oil to the second flow path, whereby a momentum of the moisture or the oil can be further reduced.

To achieve the above object, the present invention is a shock mitigating member attached to a main body portion provided on a passage of a fluid. The shock mitigating member includes a first flow path communicating with the passage and configured to cause the fluid to linearly flow, a wall portion provided so as to face the first flow path and configured to block the fluid from linearly flowing, and a second flow path configured to allow the first flow path and an opening formed in an outer circumferential surface of the shock mitigating member to communicate with each other, and configured to cause the fluid to flow in a direction different from an axial center of the first flow path, and a gap is formed between the shock mitigating member and an inner circumferential surface of the main body portion, wherein the gap is configured to adjust the pressure of the fluid flowing out from the opening, and the inner circumferential surface surrounds the shock mitigating member in the vicinity of the opening.

According to the present invention, the pressure sensor and the shock mitigating member employs a simple configuration to thereby prevent the fluid from linearly flowing, and thus it is possible to prevent damage to the diaphragm and improve the durability of the diaphragm.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A preferred embodiment of a pressure sensor and a shock mitigating member according to the present invention will be described below in detail with reference to the accompanying drawings.

Figure 1:
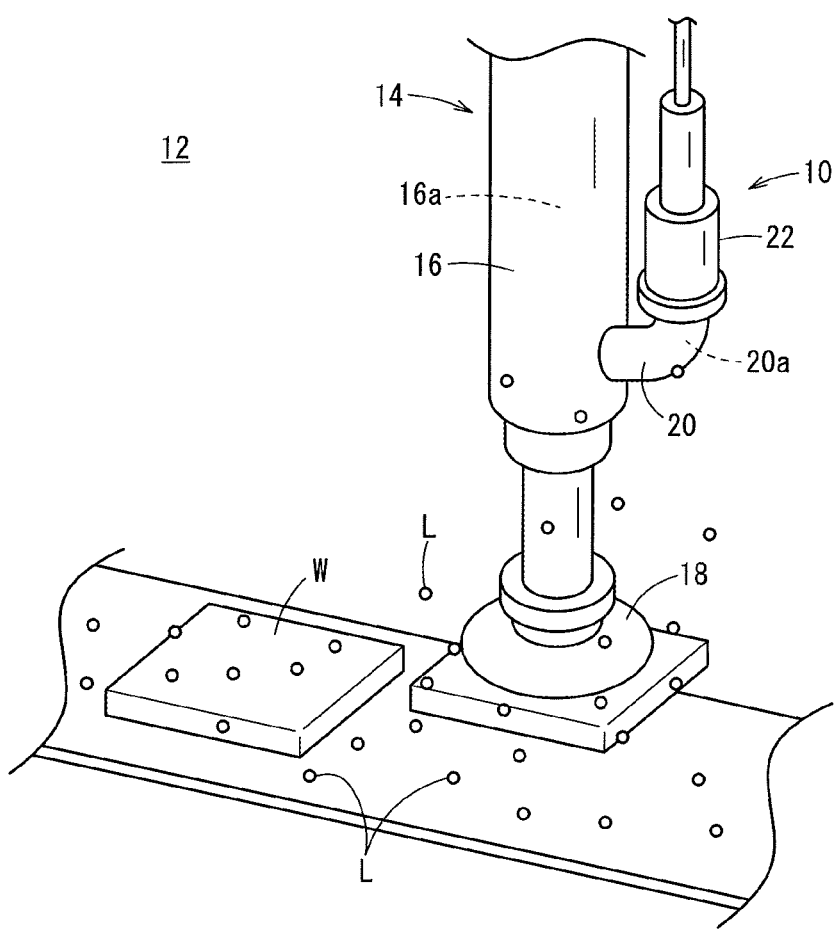
FIG. 1 is an explanatory diagram showing part of a conveying device to which a pressure sensor according to an embodiment of the present invention is applied.

As shown in FIG. 1, a pressure sensor 10 according to the present embodiment is provided on a conveying device 12 that conveys a workpiece such as a silicon wafer. For example, in a silicon wafer manufacturing process, an ingot of silicon (semiconductor) is sliced into a wafer shape, and the sliced silicon wafer is rinsed, etc. and transported to another manufacturing process by the conveying device 12. Hence, the conveying device 12 has a function of conveying a workpiece W containing moisture L (or oil).

In this case, the conveying device 12 includes a suction mechanism 14 that lifts the workpiece W containing the moisture L by a suction force. The suction mechanism 14 includes a main pipe 16 that is coupled to an air pressure adjusting device (not shown), and in which an air pressure can be adjusted, a suction pad 18 that is attached to one end side of the main pipe 16, a branch pipe 20 that branches from a halfway position in an axial direction of the main pipe 16, the pressure sensor 10 that is arranged on the branch pipe 20. The conveying device 12 includes a vertical moving mechanism (not shown) for moving the suction mechanism 14 in a vertical direction to lift or place the workpiece W, and a horizontal moving mechanism (not shown) for moving the suction mechanism 14 in a horizontal direction.

The main pipe 16 is formed as a hollow pipe including therein a main passage 16a for a fluid. The suction pad 18 is made of an elastic material in the form of a dome shape, and includes an inner space that communicates with the main passage 16a of the main pipe 16. Hence, when the vertical moving mechanism lowers the main pipe 16 and the suction pad 18, the suction pad 18 comes into contact with the workpiece W. Then the air pressure adjusting device applies a negative pressure to the main passage 16a of the main pipe 16, the air in the inner space of the suction pad 18 is suctioned, and the rinsed workpiece W containing the moisture L is attracted to the suction pad 18 by suction.

As the vertical moving mechanism lifts the main pipe 16 and the suction pad 18, the conveying device 12 accordingly lifts the workpiece W, and further conveys the workpiece W in the horizontal direction by the horizontal moving mechanism. After the horizontal moving mechanism conveys the workpiece W to a position above a desired position, the vertical moving mechanism lowers the workpiece W to place the workpiece W at this desired position. At this time, the conveying device 12 causes the air pressure adjusting device to apply a positive pressure to the main passage 16a of the main pipe 16, and causes the suction pad 18 to release the attraction of the workpiece W.

The branch pipe 20 of the suction mechanism 14 is a pipe that includes a branch path 20a (passage) that communicates with the main passage 16a of the main pipe 16, and in which the fluid flowing in the main pipe 16 flows into this branch path 20a. The pressure sensor 10 is arranged on this branch pipe 20. The pressure sensor 10 detects an air pressure in the branch pipe 20 and transmits a detection signal to a control unit (not shown) of the conveying device 12. Further, the control unit determines whether the suction mechanism 14 holds the workpiece W, releases the workpiece W, or fails to hold the workpiece W, based on the detection signal of the pressure sensor 10.

Figure 2A:
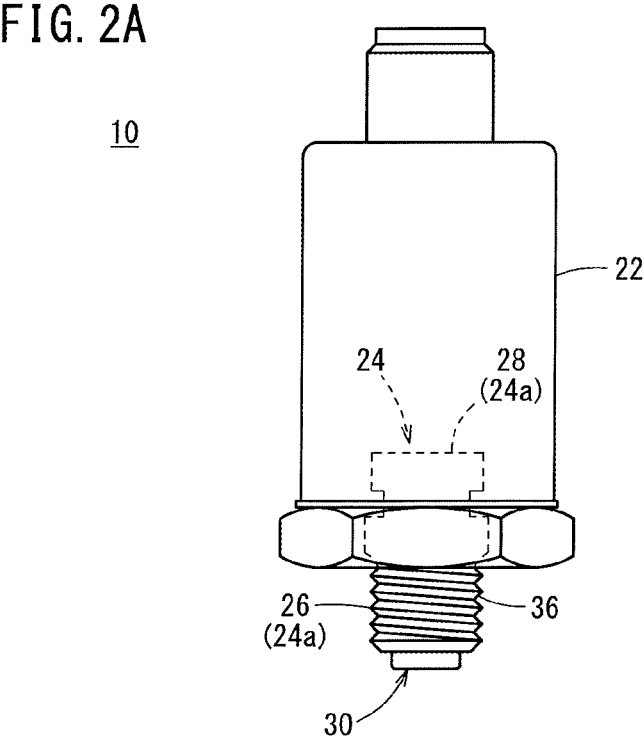
FIG. 2A is a side view of the pressure sensor in FIG. 1.
Figure 2B:
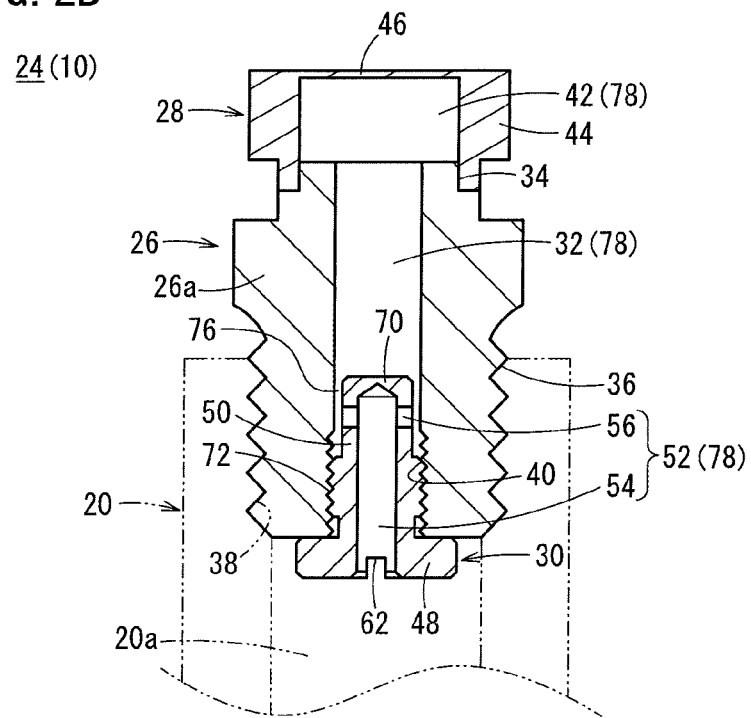
FIG. 2B is a side cross sectional view showing a detecting unit of the pressure sensor in FIG. 2A.

As shown in FIG. 2A, the pressure sensor 10 includes a housing 22 of a cylindrical shape, and further includes in the housing 22 a detecting unit 24 that receives a fluid in the branch path 20a of the branch pipe 20 and detects the pressure of the fluid. As shown in FIGS. 2A and 2B, the detecting unit 24 includes a main body portion 24a that couples the branch pipe 20 and the housing 22, and further includes a shock mitigating member 30 that is detachably attached to this main body portion 24a. The main body portion 24a includes a joint portion 26, and a pressure sensor element 28 that is arranged at one end portion (upper end portion) of the joint portion 26. The shock mitigating member 30 is arranged at the other end portion (lower end portion) of the joint portion 26.

The joint portion 26 includes a cylindrical wall 26a that is long in the axial direction, and is formed as a member of a cylindrical shape that is attached to the housing 22 of the pressure sensor 10. An outer diameter of the cylindrical wall 26a of this joint portion 26 changes from the one end portion to the other end portion. A through-hole 32 (hole portion) through which the fluid flows is formed penetrating an axial center portion of the joint portion 26. The through-hole 32 is formed with a substantially constant diameter in the axial direction, and the diameter is appropriately set based on a relationship with the shock mitigating member 30 described below.

At the one end portion of the joint portion 26, a connected portion 34 to which the pressure sensor element 28 is attached is arranged. The connected portion 34 is formed into an annular shape of a smaller diameter than an intermediate portion of the joint portion 26, and has an outer circumferential surface and a step portion to which the pressure sensor element 28 is fixed. The intermediate portion of the joint portion 26 extends radially outward, and the diameter of the intermediate portion is greatest in the joint portion 26. The intermediate portion is coupled and fixed to the housing 22 of the pressure sensor 10.

In a predetermined range of the joint portion 26 from the intermediate portion to the other end portion, a sensor fixing male screw portion 36 that is a connection structure for connecting the pressure sensor 10 to the branch pipe 20 is arranged. Meanwhile, a sensor fixing female screw portion 38 that is screw-engaged with and fixed to the sensor fixing male screw portion 36 is arranged on an inner circumferential surface that forms the branch path 20a of the branch pipe 20. Thus, the pressure sensor 10 is firmly coupled to the branch pipe 20.

A member fixing female screw portion 40 that is a connection structure which the shock mitigating member 30 is screw-engaged with and fixed to is arranged on an inner circumferential surface of the cylindrical wall 26a that forms the through-hole 32 at the other end portion side of the joint portion 26. For example, a pitch of a screw thread of the member fixing female screw portion 40 is different from a pitch of a screw thread of the sensor fixing male screw portion 36.

The pressure sensor element 28 of the pressure sensor 10 is formed into a cylindrical shape including a bottom portion, and contains therein a detection space 42 that communicates with the through-hole 32. This pressure sensor element 28 is made of an elastic material and formed by integrally molding a sidewall 44 that is attached to the connected portion 34 of the joint portion 26, and a diaphragm 46 that is arranged at one end side of the sidewall 44 (a side opposite to the other end attached to the connected portion 34) to form the bottom portion.

The sidewall 44 of the pressure sensor element 28 is formed sufficiently thicker than the thickness of the diaphragm 46, and supports an outer rim of the diaphragm 46. Hence, even when the fluid flows in the detection space 42, the sidewall 44 does not easily elastically deform, and facilitates deformation of the diaphragm 46.

The diaphragm 46 is formed into a circular shape in planar view, and in the form of a thin film. The diaphragm 46 is joined to an inner surface of one end of the sidewall 44 so as to close the detection space 42 in an air-tight manner. On a surface of the diaphragm 46 opposite to the detection space 42, an unillustrated detection circuit (a bridge circuit formed by combining predetermined resistances, or the like) is mounted. The detection circuit changes an output signal when a resistance value changes in response to the elastic deformation of the diaphragm 46. A detection structure that detects a pressure based on deformation of the diaphragm 46 may employ various structures.

Meanwhile, the shock mitigating member 30 of the pressure sensor 10 is provided to prevent the fluid (air, moisture L, etc.) flowing from the branch path 20a of the branch pipe 20 into the through-hole 32 and the detection space 42 of the pressure sensor 10 from linearly flowing toward the diaphragm 46. As shown in FIGS. 2B and 3A to 3C, this shock mitigating member 30 has a screw shape as a whole, and includes a head portion 48 that is exposed from the joint portion 26 and a body portion 50 that is inserted in the joint portion 26.

Inside the shock mitigating member 30, a flow path 52 through which the fluid flows from the branch path 20a to the through-hole 32 is provided. The flow path 52 is made up of a first flow path 54 that extends along an axial center of the shock mitigating member 30 (the head portion 48 and the body portion 50), and a pair of second flow paths 56 that communicate with the first flow path 54 and extend in a direction different from an axial center of the first flow path 54.

The head portion 48 of the shock mitigating member 30 is formed into a disk shape. The head portion 48 closes the through-hole 32 in a state where the shock mitigating member 30 is attached to the joint portion 26, and is caught on one end of the joint portion 26. Hence, the outer diameter of the head portion 48 is formed larger than the diameter of the through-hole 32.

This head portion 48 includes a joining surface 58 to which the body portion 50 is joined, and an exposed surface 60 that is at a side opposite to the joining surface 58. The joining surface 58 and the exposed surface 60 are formed into flat shapes. Corner portions at outer circumferential sides of the joining surface 58 and the exposed surface 60 are chamfered.

At a center portion of the exposed surface 60, an inlet 54a that communicates with the first flow path 54 is formed. The inlet 54a is formed into a circular shape slightly larger than the first flow path 54 when seen in planar view facing the exposed surface 60 of the head portion 48 (see FIG. 3A), and is configured to include a tapered portion 61 that is inclined toward the body portion 50 from the exposed surface 60 along the axial center direction (see FIG. 3B).

On the exposed surface 60 of the head portion 48, a pair of groove portions 62 that extend in the radial direction sandwiching the inlet 54a therebetween are formed. The pair of groove portions 62 form such a portion that, when the shock mitigating member 30 is screwed to the joint portion 26, a tool (a distal end of a flathead screwdriver) is inserted into the portion and operated to rotate. The pair of groove portions 62 communicate with the first flow path 54 via a center portion of the head portion 48, and extend to an outer circumferential surface of the head portion 48 at an outside in the radial direction. A groove width of each groove portion 62 is narrower than the diameter of the first flow path 54. The depth of each groove portion 62 is set to approximately ½ of the thickness of the head portion 48, for example. In this regard, the groove portions 62 may collectively form a cross shape in which a Phillips-head screwdriver can be inserted for screwing.

The body portion 50 of the shock mitigating member 30 is joined to a center portion of the joining surface 58, and protrudes in a direction perpendicular to the planar direction of the joining surface 58. The body portion 50 includes a joining tubular portion 64, a screw tubular portion 66, and a flow amount adjustment tubular portion 68 in order from the side of the head portion 48 to a protrusion end thereof (the depth side in the insertion direction).

The first flow path 54 of the shock mitigating member 30 has a circular cross section, and linearly extends through the axial centers of the head portion 48, the joining tubular portion 64, the screw tubular portion 66 and the flow amount adjustment tubular portion 68 so as to have a constant diameter over the entire length. The first flow path 54 communicates with the pair of second flow paths 56 formed in a circumferential wall of the flow amount adjustment tubular portion 68. At the protrusion end of the body portion 50, a blocking wall 70 (wall portion) that blocks the first flow path 54 is provided.

In more detail, the joining tubular portion 64 has a cylindrical shape, and separates the screw tubular portion 66 from the joining surface 58 of the head portion 48. A surrounding wall 64a of the joining tubular portion 64 is relatively thick, so that the head portion 48 and the body portion 50 are strongly joined to each other.

The screw tubular portion 66 includes a surrounding wall 66a that swells radially outward slightly beyond the surrounding wall 64a of the joining tubular portion 64, and on an outer circumferential surface thereof, a member fixing male screw portion 72 having a plurality of screw threads is formed. The member fixing male screw portion 72 is formed into a screw shape that can be screwed into the member fixing female screw portion 40 of the joint portion 26. An attachment mechanism for attaching the joint portion 26 and the shock mitigating member 30 to each other can employ various configurations, and may employ, for example, a fitting mechanism.

The flow amount adjustment tubular portion 68 is disposed so as not to contact with an inner circumferential surface of the through-hole 32 of the joint portion 26 (i.e., so as to form a gap 76 therebetween) in a state where the shock mitigating member 30 is attached to the joint portion 26. The flow amount adjustment tubular portion 68 includes a surrounding wall 68a that is connected to the screw tubular portion 66, and the blocking wall 70 that closes projection ends of the surrounding wall 68a.

The surrounding wall 68a of the flow amount adjustment tubular portion 68 extends with a constant outer diameter and surrounds the first flow path 54, and includes the pair of second flow paths 56 in the wall. By the flow amount adjustment tubular portion 68, the first flow path 54 is elongated toward the blocking wall 70 (the depth side in the insertion direction of the shock mitigating member 30: a downstream side in the flowing direction of the fluid) slightly beyond the pair of second flow paths 56 so as to form a pocket 74 that can receive the fluid by using the surrounding wall 68a and the blocking wall 70. An inner surface 70a of the pocket 74 is formed into a conical surface (a funnel-shaped surface). Meanwhile, an outer end surface 70b of the blocking wall 70 is formed into a flat end surface perpendicular to an axial center of the shock mitigating member 30.

Figure 3A:
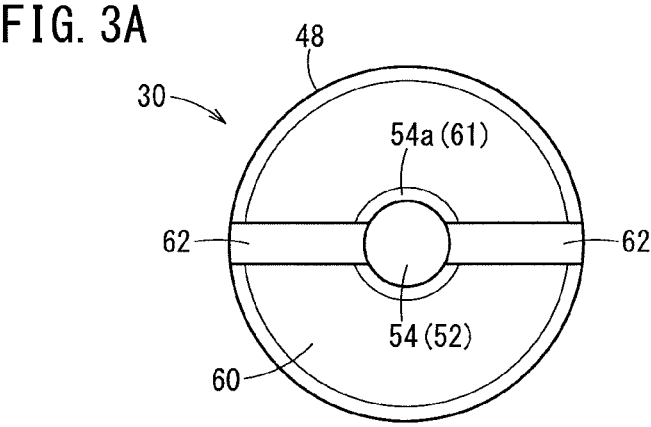
FIG. 3A is a plan view showing a shock mitigating member in FIG. 2B from a head portion side.
Figure 3B:
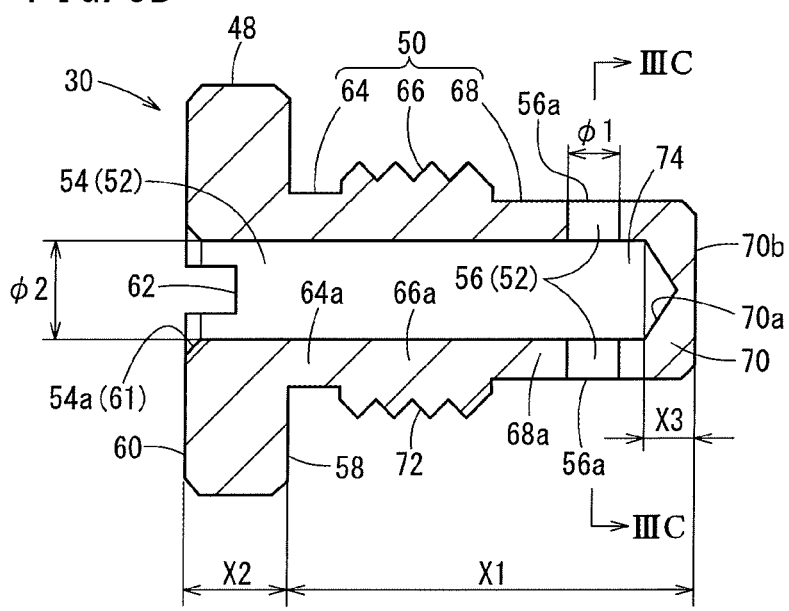
FIG. 3B is an enlarged side cross sectional view of the shock mitigating member in FIG. 2B.

The pair of second flow paths 56 are arranged at the same positions in the axial direction of the flow amount adjustment tubular portion 68 when seen in a side cross sectional view parallel to the axial center of the shock mitigating member 30 shown in FIG. 3B. The second flow paths 56 extend in a direction perpendicular to the axial center of the first flow path 54, and penetrate an inner circumferential surface and an outer circumferential surface of the surrounding wall 68a. On an outer circumferential surface of the flow amount adjustment tubular portion 68, outlets 56a (openings) that communicate with the pair of second flow paths 56 are formed. Each second flow path 56 has a circular cross section, and extends with a constant diameter, and each outlet 56a has a circular shape of the same diameter as the second flow path 56.

Figure 3C:
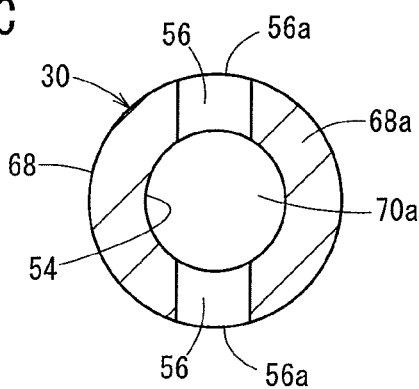
FIG. 3C is a cross sectional view taken along line IIIC-IIIC in FIG. 3B.

The pair of second flow paths 56 mutually extend in opposite directions from the first flow path 54 when seen in a cross sectional view perpendicular to the axial center of the shock mitigating member 30 shown in FIG. 3C. The fluid that has flowed through the first flow path 54 bifurcates and flows into the pair of second flow paths 56, and then flows out from each outlet 56a to an outside of the shock mitigating member 30.

The pair of second flow paths 56 and the outlets 56a are preferably arranged at positions somewhat spaced away from the blocking wall 70 of the body portion 50 toward the head portion 48. As a result, a length of the gap 76 in the axial direction described below becomes long. The pair of second flow paths 56 and the outlets 56a are provided at positions that are spaced away from the screw tubular portion 66 to a certain degree (e.g., a distance longer than the length of the joining tubular portion 64 in the axial direction). As a result, the outlets 56a are disposed more deeply or more inward (the side toward the diaphragm 46) than the member fixing female screw portion 40 of the joint portion 26 in an assembled state.

The outer diameter of the flow amount adjustment tubular portion 68 is smaller than the diameter of the through-hole 32 of the joint portion 26. Therefore, the shock mitigating member 30 forms the gap 76 between an outer circumferential surface of the surrounding wall 68a and an inner circumferential surface of the joint portion 26 (see FIGS. 2 and 4). The gap 76 is a cylindrical space that surrounds the flow amount adjustment tubular portion 68, and allows the fluid that flows out through the pair of second flow paths 56 and the outlets 56a to flow to a deeper side (inner side) of the through-hole 32.

A flow path cross sectional area (effective cross sectional area) of the gap 76 is appropriately designed according to a target fluid flow amount. In the pressure sensor 10, the outer diameter of the flow amount adjustment tubular portion 68 may be adjusted or the inner diameter of the joint portion 26 may be adjusted in order to adjust the flow path cross sectional area of the gap 76. Particularly by adjusting the inner diameter of the joint portion 26, it is possible to easily adjust the flow path cross sectional area of the gap 76 to a desired size without processing the shock mitigating member 30 (i.e., while suppressing damage to the member). A corner portion of the blocking wall 70 of the flow amount adjustment tubular portion 68 continuous to the surrounding wall 68a is cut out to widen the gap 76 at a protrusion end of the shock mitigating member 30.

When the above shock mitigating member 30 is manufactured, a metal material (e.g., stainless steel) of a round bar shape is lathed. Thus, the head portion 48 having the groove portions 62, and the outer circumferential surface of the body portion 50 having the joining tubular portion 64, the screw tubular portion 66 (member fixing male screw portion 72) and the flow amount adjustment tubular portion 68 are formed. Subsequently, a drill is used to make a hole from a center portion of the head portion 48 to the body portion 50 and is inserted to form the first flow path 54. In this case, drilling is stopped before penetrating the body portion 50, whereby the blocking wall 70 is formed. Thereafter, the drill is inserted from a predetermined position on the flow amount adjustment tubular portion 68 in a direction perpendicular to the first flow path 54 to thereby form the pair of second flow paths 56. Then, the shock mitigating member 30 having a flow path 52 of a T shape in side cross sectional view is obtained.

The dimension of the shock mitigating member 30 may be appropriately designed according to the dimension of the pressure sensor 10. For example, a length X1 of the body portion 50 in the axial direction is preferably in a range of approximately three to five times of a length X2 of the head portion 48 in the axial direction (i.e., the thickness of the head portion 48). A thickness X3 of the blocking wall 70 is preferably in a range of approximately ⅕ to 1/10 times of the length X1 of the body portion 50 in the axial direction. For example, a diameter φ1 of each of the second flow paths 56 may be in a range of approximately ⅓ to 1 times of a diameter φ2 of the first flow path 54.

The shock mitigating member 30 is inserted in the through-hole 32 of the joint portion 26 to which the pressure sensor element 28 is fixed, and the tool is inserted in the groove portions 62 and is turned, so that the member fixing male screw portion 72 is screwed to the member fixing female screw portion 40. Thus, in the pressure sensor 10, the first flow path 54 of the shock mitigating member 30, the pair of second flow paths 56, the through-hole 32 of the joint portion 26 (including the gap 76) and the detection space 42 of the pressure sensor element 28 communicate with each other to thereby form a communication space 78 for detecting a pressure of the fluid.

The communication space 78 is preferably formed to a size that sufficiently attenuates the pressure of the fluid, and allows the fluid to flow without clogging. For example, an outer diameter φ3 of the flow amount adjustment tubular portion 68 is formed in a range of approximately ⅘ to 9/10 times of a diameter φ4 of the through-hole 32 of the joint portion 26. Consequently, it is possible to secure a sufficient flow path cross sectional area of the gap 76 and to flow the air or the moisture L without clogging. Further, in the communication space 78, the flow path cross sectional area of the pair of second flow paths 56 may be smaller than the flow path cross sectional area of the first flow path 54. A flow path cross sectional area of the gap 76 between the joint portion 26 and the shock mitigating member 30 may be formed smaller than the flow path cross sectional area of the pair of second flow paths 56. Consequently, it is possible to attenuate the pressure of the fluid stepwise.

The pressure sensor 10 according to the present embodiment is basically configured as described above, and an operation and an effect of the pressure sensor 10 will be described below.

As described above, the pressure sensor 10 is attached to the branch pipe 20 of the conveying device 12 (suction mechanism 14), so that the branch path 20a of the branch pipe 20 communicates with the communication space 78. Further, the pressure sensor 10 detects a change in the pressure in the main passage 16a when the main pipe 16 suctions the workpiece W (silicon wafer).

Figure 4:
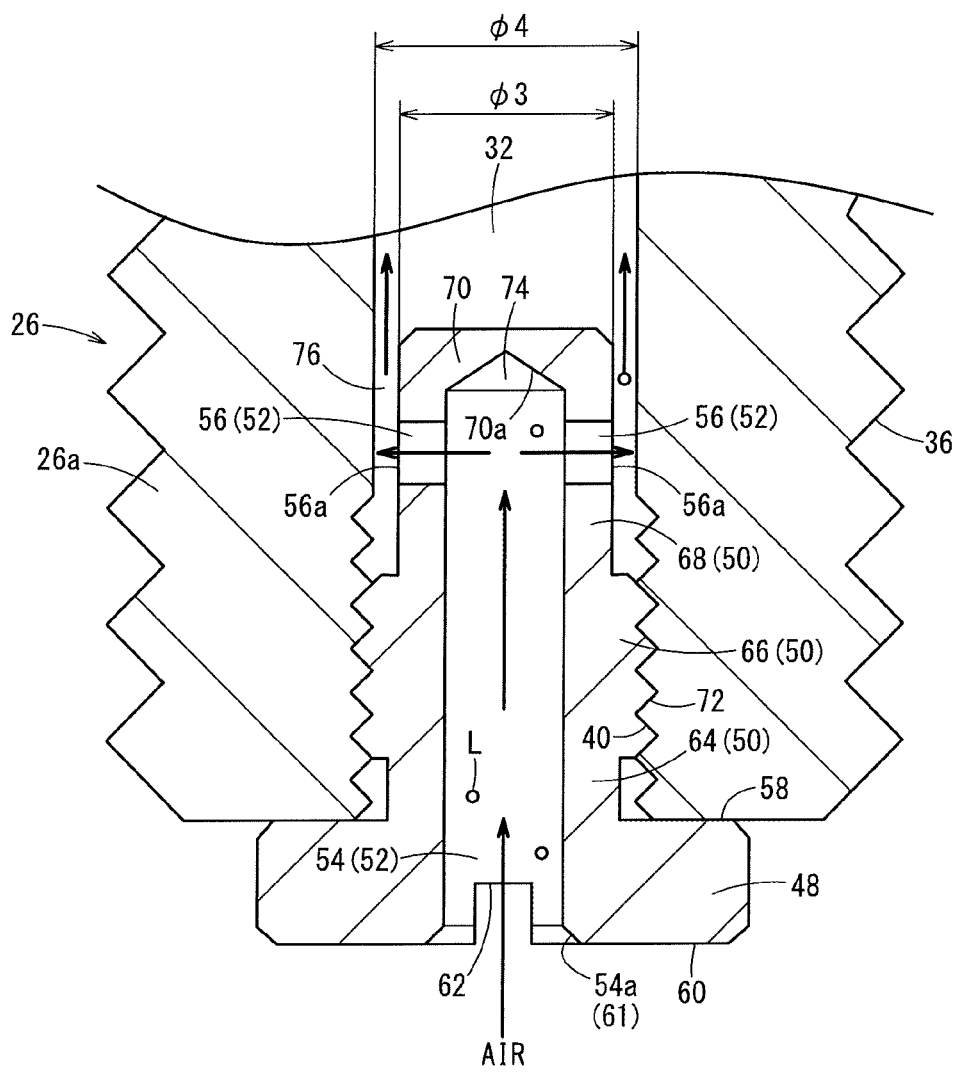
FIG. 4 is an enlarged cross sectional view showing main portions of the pressure sensor in FIG. 2B in operation.

In this regard, in the case that the moisture L adheres to the workpiece W, when the main pipe 16 suctions and then releases the workpiece W, the moisture L of the workpiece W flows into the branch pipe 20 together with air. That is, as shown in FIG. 4, the air and the moisture L flow into the communication space 78 of the pressure sensor 10 from the branch path 20a. More specifically, in the attached state of the pressure sensor 10, the axial center of the first flow path 54 coincides with an axial center of the branch path 20a (parallel state). Thus, the air and the moisture L flow from the branch path 20a through the inlet 54a of the shock mitigating member 30, and easily flow into the first flow path 54.

The fluid including the air and the moisture L linearly moves in the first flow path 54 of the shock mitigating member 30. However, the blocking wall 70, which is the protrusion end of the body portion 50 (flow amount adjustment tubular portion 68), blocks the flow of the fluid. The fluid passes through the pair of second flow paths 56 of the flow amount adjustment tubular portion 68, and flows out from the outlets 56a of the shock mitigating member 30 to the gap 76 of the through-hole 32 of the joint portion 26. That is, the shock mitigating member 30 changes the flow direction of the fluid to a direction perpendicular to the axial center of the first flow path 54 and then causes the fluid to flow out without allowing the fluid to linearly flowing out from the first flow path 54 to the through-hole 32. Consequently, it is possible to prevent the moisture L contained in the fluid from linearly moving and hitting the diaphragm 46.

When flowing out from the outlet 56a of the shock mitigating member 30, the fluid passes through the gap 76 near the inner circumferential surface of the through-hole 32 and flows inwardly of the through-hole 32. As described above, the gap 76 of the through-hole 32 is formed by an interval between the joint portion 26 and the shock mitigating member 30 to adjust an air flow amount. The gap 76 causes the fluid to flow in a circumferential direction of the flow amount adjustment tubular portion 68, and to flow toward the deep side of the through-hole 32. In the structure, the fluid produces a uniformly-spread surge pressure in the through-hole 32 on the downstream side of the shock mitigating member 30. Further, the fluid passes through the through-hole 32 in this state and flows to the detection space 42.

As a result, the fluid applies a weak pressure to a facing surface of the diaphragm 46, and elastically deforms the diaphragm 46. Particularly, shock of the moisture L against the diaphragm 46 is mitigated. Consequently, it is possible to significantly suppress damage to the diaphragm 46 and facilitate elastic deformation of the diaphragm 46. The pressure sensor 10 outputs a detection value of the pressure corresponding to a deformation amount of the diaphragm 46, to the control unit, and consequently enables the control unit to recognize whether the conveying device 12 holds, releases or fails to hold the workpiece W.

As described above, the pressure sensor 10 according to the present embodiment employs a simple configuration where the shock mitigating member 30 is attached to the joint portion 26, so that it is possible to improve durability of the diaphragm 46. That is, the fluid (the air and the moisture L) flows from the branch path 20a to the first flow path 54 of the shock mitigating member 30, then linearly flows through the first flow path 54, and the linear flow of the fluid is blocked by the blocking wall 70 at the downstream side. Then, the fluid changes the course, passes through the pair of second flow paths 56 in the direction different from the first flow path 54, and flows out from the outlets 56a. Further, the fluid flows to the detection space 42 via the gap 76. Then, the diaphragm 46 detects the pressure. Particularly, even when the fluid includes the moisture L or the oil, the shock mitigating member 30 can prevent the moisture L or the oil from passing through the first flow path 54 and directly hitting the diaphragm 46, and significantly suppress damage to the diaphragm 46. Further, the shock mitigating member 30 or an inner wall (inner circumferential surface) of the joint portion 26 can make it possible to easily adjust a flow path cross sectional area of the gap 76 and flow the fluid appropriately.

In this case, the shock mitigating member 30 is formed into the screw shape, and consequently can be easily attached to the inner wall of the joint portion 26. In the pressure sensor 10, the flow path cross sectional area of the gap 76 can be easily adjusted by exchanging the shock mitigating member 30 when necessary. In addition to this, the head portion 48 of the shock mitigating member 30 includes the groove portion 62. Consequently, it becomes easier to attach and detach the shock mitigating member 30 to and from the joint portion 26. Further, when the first or second flow path 54, 56 is subjected to clogging, it is possible to quickly perform maintenance and repair. Further, the groove portions 62 can cause the fluid in the passage to smoothly flow into the first flow path 54.

The shock mitigating member 30 includes the outlets 56a disposed more deeply in the insertion direction than the member fixing male screw portion 72, and the outer circumferential surface of the flow amount adjustment tubular portion 68 is formed into a smooth surface (i.e., a flat shape in side cross sectional view of the shock mitigating member 30). Consequently, when the fluid flows out from the outlet 56a, the fluid can stably flow along the gap 76. Axial centers of the second flow paths 56 are perpendicular to the axial center of the first flow path 54. Thus, it is possible to move the fluid that has flowed through the first flow path 54 and been blocked from flowing by the blocking wall 70, toward the outside in the radial direction of the first flow path 54 suitably. The pressure sensor 10 further includes the pocket 74. Thus, the moisture L and the oil can be first received by the pocket 74 and then moved to the second flow paths 56. Consequently, it is possible to lower the momentum of the moisture L or the oil.

In this regard, the pressure sensor 10 according to the present invention is not limited to the above, and can employ various modifications and applications. For example, the shock mitigating member 30 may not include the pocket 74, but include the pair of second flow paths 56 that are continuous to the inner surface 70a of the blocking wall 70.

Figure 5A:
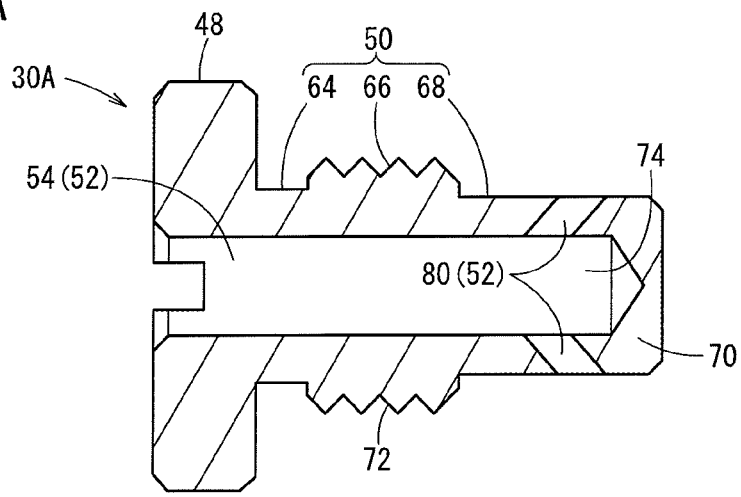
FIG. 5A is a side cross sectional view of the shock mitigating member according to a first modification.

In a shock mitigating member 30A according to a first modification shown in FIG. 5A, when seen in side cross sectional view, a pair of second flow paths 80 may be inclined radially outwardly and toward the protrusion end with respect to the axial center of the first flow path 54. Thus, even when the pair of second flow paths 80 are inclined, it is possible to cause the fluid (the air and the moisture L) to flow out to the gap 76 of the through-hole 32 via the pair of second flow paths 80. Consequently, it is possible to provide the same effect as that of the shock mitigating member 30 according to the present embodiment.

Figure 5B:
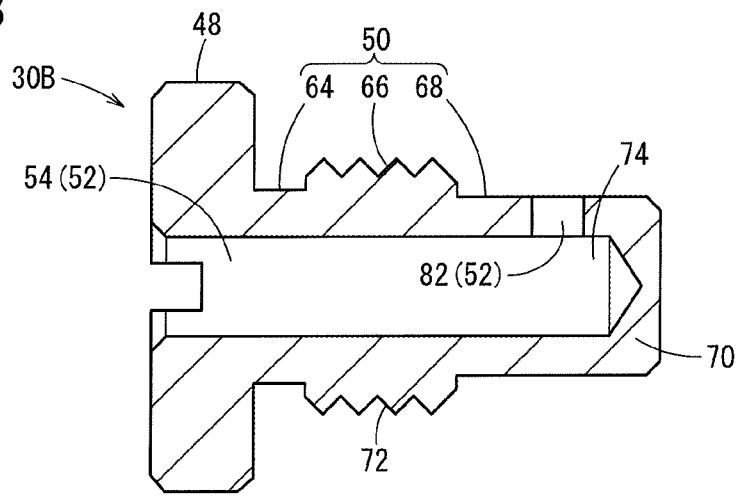
FIG. 5B is a side cross sectional view of the shock mitigating member according to a second modification.
Figure 5C:
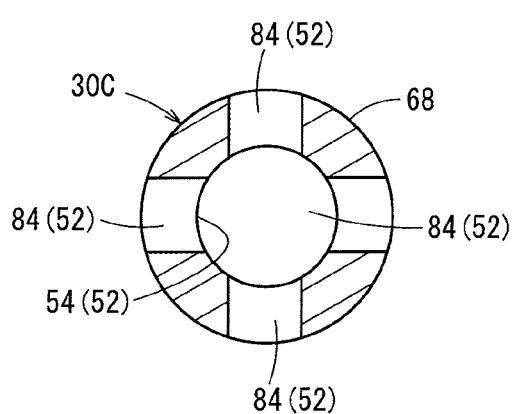
FIG. 5C is a sectional view taken along an axial center of a second flow path of a shock mitigating member according to a third modification.

According to a second modification shown in FIG. 5B, a shock mitigating member 30B may include one second flow path 82 for the first flow path 54, and the flow path 52 of an L shape may be formed when seen in side surface cross sectional view. Further, according to a third modification shown in FIG. 5C, a shock mitigating member 30C may include a plurality of (four in FIG. 5C) second flow paths 84 that are radially formed for the first flow path 54 at an axial center portion. That is, shapes of the second flow paths 56, 80, 82, 84 in a case where the shock mitigating member 30 changes a course of the fluid are not limited in particular, and can be freely designed according to a target fluid flow amount or target pressure reduction amount.

The present invention is not limited to the above embodiment, and can be variously modified without departing from the scope of the present invention.

What is claimed is:

1. A pressure sensor comprising:
a main body portion provided on a passage of a fluid; and
a shock mitigating member attached to the main body portion, wherein:
the shock mitigating member includes
a first flow path communicating with the passage and configured to cause the fluid to linearly flow,
a wall portion provided so as to face the first flow path and configured to block the fluid from linearly flowing, and
a second flow path configured to allow the first flow path and an opening formed in an outer circumferential surface of the shock mitigating member to communicate with each other, and configured to cause the fluid to flow in a direction different from an axial center of the first flow path, and
a gap is formed between the shock mitigating member and an inner circumferential surface of the main body portion, the gap being configured to adjust a pressure of the fluid flowing out from the opening, the inner circumferential surface surrounding the shock mitigating member in a vicinity of the opening; and
the main body portion includes
a detection space communicating with the gap, and
a diaphragm configured to detect the pressure of the fluid flowing in the detection space.

2. The pressure sensor according to claim 1, wherein the shock mitigating member is formed into a screw shape attachably and detachably screwed to a hole portion formed by the inner circumferential surface.

3. The pressure sensor according to claim 2, wherein:
the shock mitigating member includes a head portion which is exposed through the hole portion in a state where the shock mitigating member is fixed to the inner circumferential surface; and
the head portion includes a groove portion configured to allow a tool to be inserted and operated, the groove portion communicating with the first flow path, wherein the tool is configured to screw the shock mitigating member.

4. The pressure sensor according to claim 2, wherein:
the shock mitigating member includes a male screw portion screwed to the inner circumferential surface, and the opening is disposed more deeply in an insertion direction of the shock mitigating member than the male screw portion; and
an outer circumferential surface of the shock mitigating member in a vicinity of the opening is formed into a flat shape when seen in side cross sectional view of the shock mitigating member.

5. The pressure sensor according to claim 1, wherein an axial center of the second flow path is perpendicular to the axial center of the first flow path.

6. The pressure sensor according to claim 1, wherein the wall portion is arranged at a position apart from a communication position between the first flow path and the second flow path, and forms a pocket configured to receive the fluid, at a downstream side in a flow direction of the first flow path.

7. A shock mitigating member attached to a main body portion provided on a passage of a fluid, the shock mitigating member comprising:
a first flow path communicating with the passage and configured to cause the fluid to linearly flow;
a wall portion provided so as to face the first flow path and configured to block the fluid from linearly flowing; and
a second flow path configured to allow the first flow path and an opening formed in an outer circumferential surface of the shock mitigating member to communicate with each other, and configured to cause the fluid to flow in a direction different from an axial center of the first flow path, and
a gap is formed between the shock mitigating member and an inner circumferential surface of the main body portion, the gap being configured to adjust a pressure of the fluid flowing out from the opening, the inner circumferential surface surrounding the shock mitigating member in a vicinity of the opening.

* * * * *